United States Patent [19]
Wenger

[11] 3,812,756
[45] May 28, 1974

[54] POSITIVE LOCK SELF-RETAINED FASTENER

[76] Inventor: Maurice J. Wenger, 5813 N. 13th St., Philadelphia, Pa. 19141

[22] Filed: July 18, 1972

[21] Appl. No.: 273,017

Related U.S. Application Data
[63] Continuation of Ser. No. 10,353, Feb. 11, 1970, abandoned.

[52] U.S. Cl. .................................... 85/8.8, 151/69
[51] Int. Cl. ....................... F16b 19/00, F16b 21/18
[58] Field of Search .......... 85/5 CP, 8.8, 7, 1 K, 66, 85/64, 4, 81, 79, 5 R, 5 B; 287/135; 151/69, 27, 28, 2; 24/215, 213 C, 213 R, 211 R, 110, 107; 285/321, 415

[56] References Cited
UNITED STATES PATENTS

| | | | |
|---|---|---|---|
| 1,131,293 | 3/1915 | Tilton | 24/213 R |
| 1,771,949 | 7/1930 | Blanchard | 287/DIG. 7 |
| 2,058,714 | 10/1936 | Peterson | 85/4 |
| 2,433,298 | 12/1947 | Segal | 85/4 |
| 2,623,399 | 12/1952 | Barrett | 85/8.8 |
| 2,935,343 | 5/1960 | Ellis | 85/8.8 |
| 3,026,761 | 3/1962 | Torresen | 85/84 |
| 3,221,794 | 12/1965 | Acres | 85/8.8 |
| 3,361,176 | 1/1968 | Jansen | 151/69 |
| 3,503,431 | 3/1970 | Villo et al. | 85/8.8 |

FOREIGN PATENTS OR APPLICATIONS

| | | | |
|---|---|---|---|
| 189,859 | 5/1957 | Austria | 85/8.8 |
| 853,227 | 10/1952 | Germany | 85/8.8 |
| 209,559 | 12/1966 | Sweden | 85/79 |
| 282,171 | 7/1952 | Switzerland | 85/8.8 |

*Primary Examiner*—Marion Parsons, Jr.
*Attorney, Agent, or Firm*—Paul Maleson

[57] ABSTRACT

A positive lock self retained bolt adapted to pass into a hole in a work piece. The bolt automatically locks when fully inserted. Locking means on the bolt are provided near the end thereof first inserted into the work piece and become operative to lock after passing beyond the hole in the work piece. The locking means comprise an annular groove in the bolt and a ring having an elastically compressible overall diameter in the groove. The groove has certain cross-sectional configurations, generally characterized by having one wall substantially perpendicular to the long axis of the bolt, a bottom surface, and another wall having an average slope from the bottom surface to outer surface of the bolt in the direction of insertion of the bolt, and the ring and the groove having certain mutual positional and dimensional relationships.

13 Claims, 24 Drawing Figures

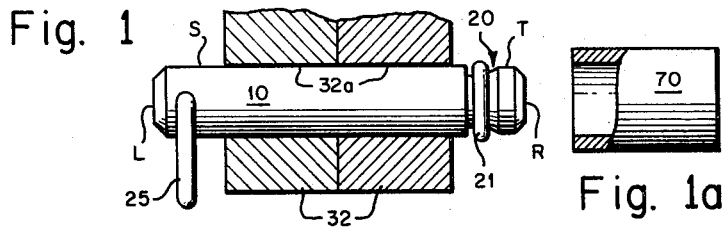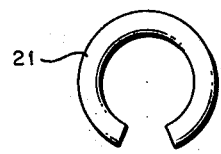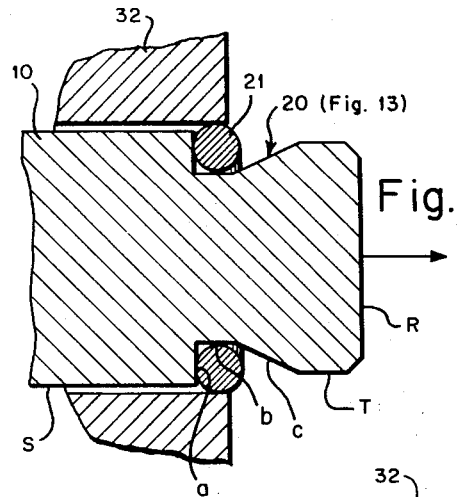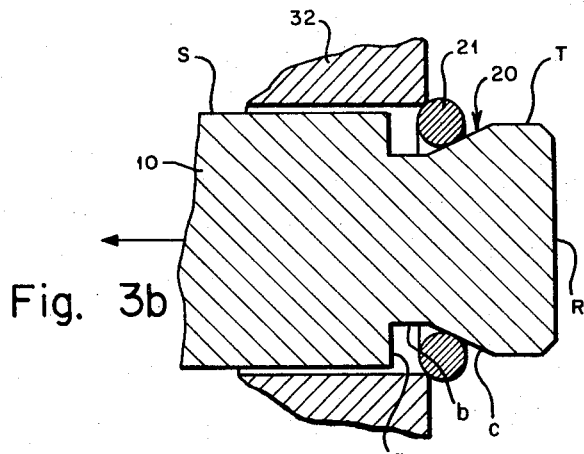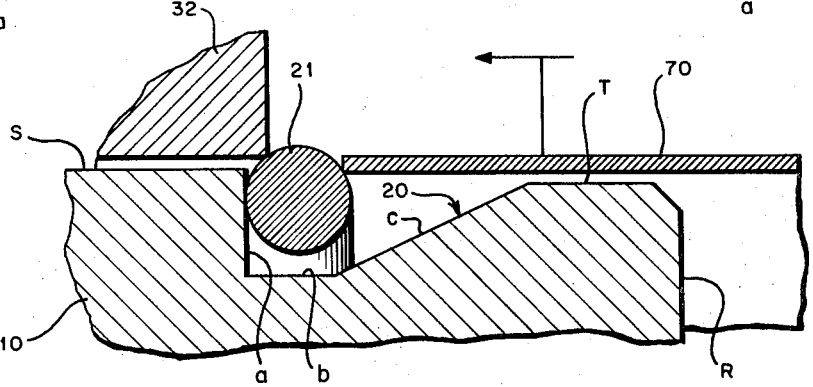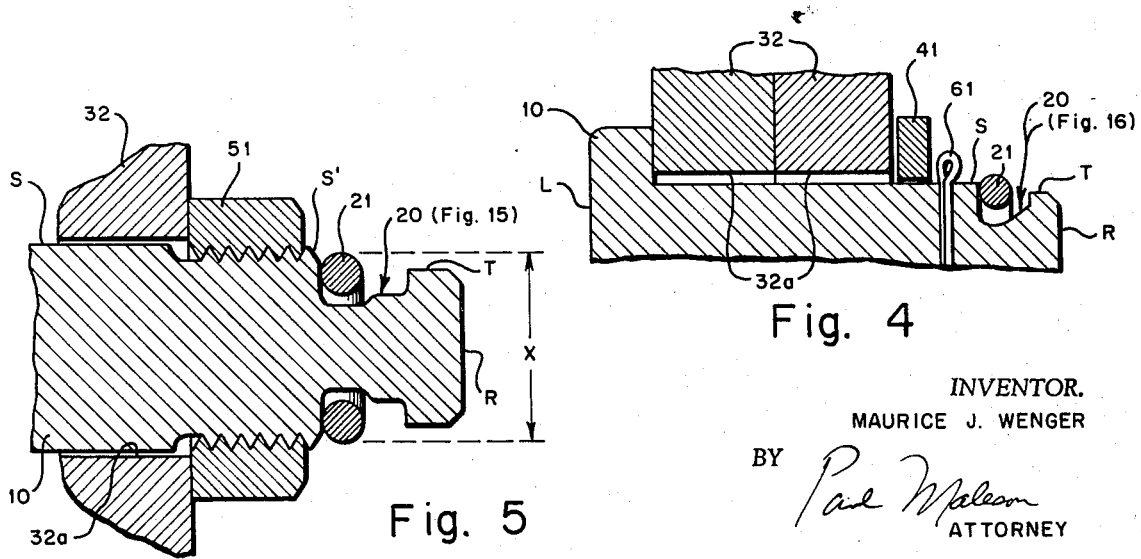
INVENTOR.
MAURICE J. WENGER

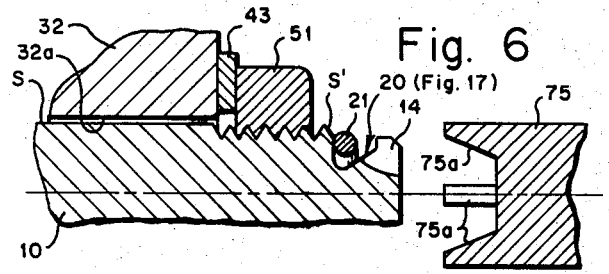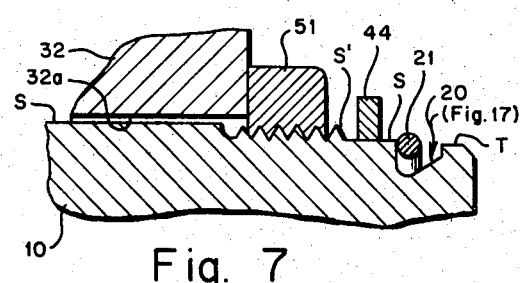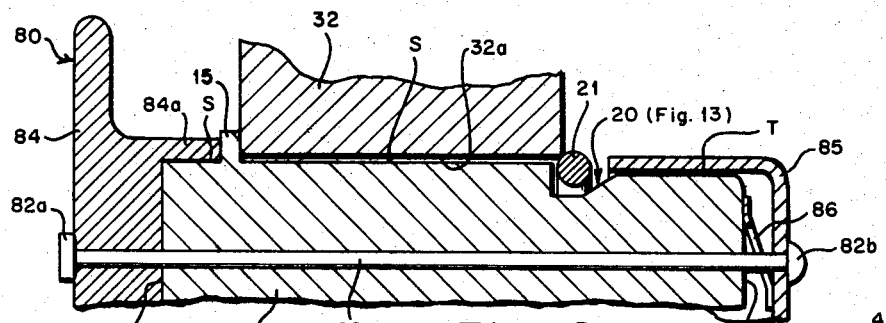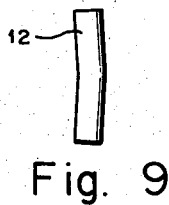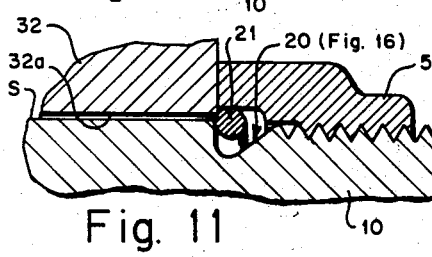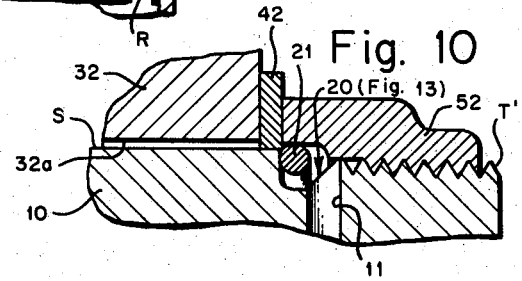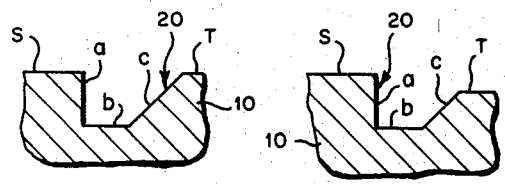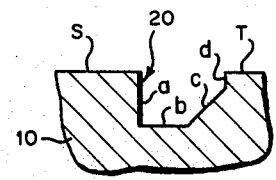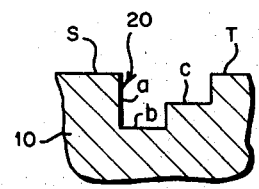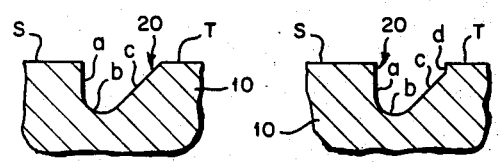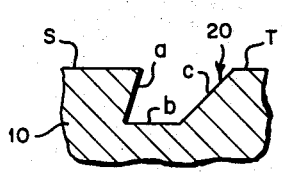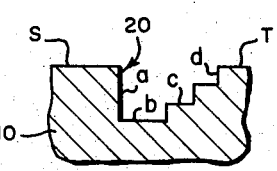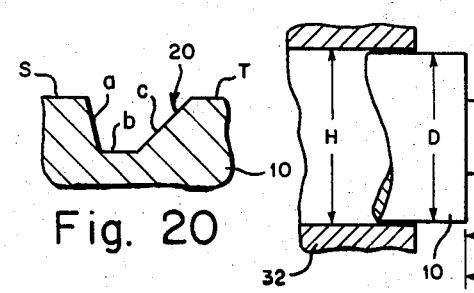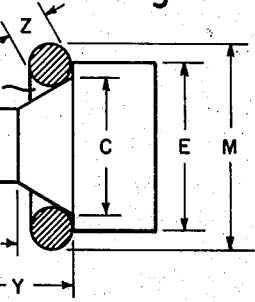
INVENTOR.
MAURICE J. WENGER
BY Paul Maleson
ATTORNEY

3,812,756

POSITIVE LOCK SELF-RETAINED FASTENER

CROSS-REFERENCE TO RELATED APPLICATIONS

This application is a continuation of U.S. Pat. Ser. No. 10,353, filed Feb. 11, 1970 and now abandoned.

BACKGROUND OF THE INVENTION

1. FIELD OF THE INVENTION

This invention relates to structural fasteners. More particularly, it relates to self-retained bolts. Self-retained bolts are fastening devices in which there is some feature or aspect of the bolt itself that tends to retain it in position through a work piece, instead of, or (much more usually) in addition to some other means for retaining the bolt in position. Typically, the purpose of providing a self-retained bolt is for safety reasons, to insure that the bolt remains in place even if the other retaining means, such as a nut, is lost by vibration or other causes, or if the other retaining means has not been applied for some reason. An important industrial field for such bolts is in the aircraft industry.

Lock bolts may be of the impedance bolt type. These bolts have a resistance to being inserted or withdrawn from the hole in the work piece. The class of self-retained bolts to which this invention relates is that of the positive lock type, that is, the type in which the self-retaining feature of the bolt provides a positive structural obstacle to withdrawal of the bolt from a hole in the work piece. The bolts of this invention are primarily intended as shear bolts, but may also have applicability as tensile bolts.

DESCRIPTION OF THE PRIOR ART

Many expedients have been attempted directed to this field. Earlier patents bearing on this subject include U.S. Pat. Nos. 3,412,774; 3,138,188; 2,615,735; 2,999,221; 3,080,184; 3,090,937; 1,407,570; 1,172,825; 3,221,794 and French Pat. No. 1,323,749 and Swiss Pat. No. 282,171. Many of these patents show structures which appear similar to some forms of the present invention. Some of these earlier expedients however, utilize a jamming aspect of a ring in a groove, and this differs in mode of operation and function from the present invention. Certain advantages and functions of the present invention may be enumerated. It will be seen that none of the devices of the highly developed prior art fulfill all these advantages and functions. This is not intended to be an exhaustive listing. The present device is simple to manufacture. The ring need not be of any non-standard or unusual configuration. The bolt may be inserted through a hole in the work piece without undue force (which may damage delicate structures). The self-retaining feature becomes operative of its own accord and without further action or attention by the operator, as soon as it is inserted. It lends itself to a great many variations in environment and form. It is a positive lock type. It is easy to use without special training. It has very high resistance to loss of function, even under adverse conditions as extreme vibration. It can easily be removed from the work piece by simple application of a simple tool. None of the previous expedients, even those appearing superficially similar, can perform all these functions or perform them to the degree of the present invention.

SUMMARY OF THE INVENTION

An object of this invention is to provide a structural fastener. More particularly, it is an object of this invention to provide a positive lock self retained bolt. The term bolt used herein has a broad meaning as a fastener, including devices which are headed, threaded, or not, and including devices which may variously be called bolts, pins, studs, rivets and by other names.

The bolt is adapted to pass into a hole in a work piece. It is provided at, near, or toward the end first inserted into the hole with a locking means. The locking means becomes operative to lock the bolt in the work piece when the locking means has passed beyond the hole in the work piece. The locking function takes place automatically.

The locking means may be the sole lock on the bolt, or it may be a safety means used in addition to other locking or holding means.

The principle of this invention makes it possible to provide a means and method for simply and reliably releasing the locking means so that the bolt may be withdrawn if desired. The locking means generally comprises an annular groove in the bolt. The annular groove may have varied configuration. In general, the cross-section of the annular groove may be described, without strict limitation, as comprising a first wall surface extending inwardly from the shank of the bolt and substantially perpendicularly thereto, a root surface extending axially of the bolt and substantially parallel to the long axis thereof, and a second wall surface sloping upwards from the root surface to the tip surface of the bolt, with the direction of the slope upward being in the direction that the bolt is intended to be inserted in the work piece.

A ring, having an elastically compressible overall diameter is provided in the groove. Generally, without strict limitation, the ring in its unconstrained state rests freely and loosely in the groove, but is not large enough to fall out of the groove. It is free to move axially of the bolt in the groove, over both the root surface and at least part of the sloping surface thereof. In its diametrically compressed or constrained state, the ring rests on or over the root surface of the groove and its outside diameter in that state is no larger than the diameter of the hole through the work piece through which it is to be withdrawn.

Some advantages of this structure are that it is insertable in the work piece with low force, thus avoiding damage to certain delicate structures. After insertion, the self retaining or locking feature becomes operative without further action by the operator. It provides a very high degree of resistance to withdrawal and retains this locking function even under adverse conditions such as vibration. It is relatively simple to manufacture and of a relatively uncomplicated structure, and requires little or nothing in the way of unusual or non-standard techniques to manufacture. It is applicable to many different environments and broad fields of use and may exist in a number of different embodiments. It can be easily unlocked by simple application of a simple tool. It is easy for the operator to both insert and unlock and withdraw.

BRIEF DESCRIPTION OF THE DRAWING

FIG. 1 is a side view, partially in cross-section of the positive locking self retaining bolt through a work piece and provided with a pull ring.

FIG. 1a is a side view, partially fragmented, of a removing tool in position to be applied to the bolt of FIG. 1.

FIG. 2 is a plan view of the split ring.

FIG. 3a is a side cross-sectional view of one form of the locking means, showing the bolt partially through the work piece.

FIG. 3b is a side cross-sectional view of the locking means of FIG. 3a showing the bolt fully inserted through the work piece in a locked position resisting withdrawal.

FIG. 3c is an enlarged side cross-sectional view of the locking means of FIG. 3a and 3b showing the locking means about to be released by the application of tool.

FIG. 4 is a side cross-sectional view of the locking means as applied to a bolt provided with a retaining washer and a cotter pin, and showing another form of the locking means.

FIG. 5 is a side cross-sectional view of the different form of the locking means as applied to a threaded bolt provided with a nut.

FIG. 6 is a side cross-section of a form of the lock bolt in locked position on a work piece with another form of removing tool adjacently positioned.

FIG. 7 is a side cross-section view of the lock bolt in locked position on a work piece showing a different environment.

FIG. 8 is a side cross-sectional view of a quick release form of the lock bolt.

FIG. 9 is a side view of another form of removing tool.

FIG. 10 is a side cross-section view of the lock bolt in conjunction with a cap nut and adapted for removal by the tool of FIG. 9.

FIG. 11 is a side cross-section view of a different form of the lock bolt with a cap nut.

FIG. 12 is a detailed side view of one form of lockbolt channel.

FIG. 13 is a detailed view of another form of lockbolt channel, as also shown in FIG. 3a, 8, and 10.

FIG. 14 is a detailed view of a preferred form of lockbolt channel.

FIG. 15 is a detailed view of another form of lockbolt channel as also shown in FIG. 5.

FIG. 16 is a detailed view of another form of lockbolt channel as also shown in FIG. 4 and 11.

FIG. 17 is a detailed view of another form of lockbolt channel as also shown in FIG. 6 and 7.

FIG. 18 is a detailed view of another form of lockbolt channel.

FIG. 19 is a detailed view of another form of lockbolt channel.

FIG. 20 is a detailed view of another form of lockbolt channel.

FIG. 21 is a view of part of the lock-bolt of the form as shown in FIG. 14, in position with respect to a work piece, showing workable diamensional relationships.

DESCRIPTION OF THE PREFERRED EMBODIMENTS

In general, throughout this specification, the fastener, a positive locking self-retaining bolt, is referred to as the bolt. The structure on the bolt which provides the positive locking aspect of the present invention may generally be referred to as the locking means, or the lock means.

FIG. 1 shows a bolt, generally designated 10, provided through a work piece 32, which in this case comprises a pair of panels in face-to-face relationship. In this embodiment, the locking means is the sole means of retaining the bolt through the work piece. A pull ring 25 is provided at one end of bolt 10 in the FIG. 1 embodiment to aid in withdrawing the bolt from the work piece.

The bolt has a left end surface L and a right end surface R. The major length of the bolt 32 may be designated the shank, and the shank is provided with a shank surface S. A shaped annular groove, generally designated 20 is provided, at least one form of this groove 20 being present in all embodiments of the invention. Considering the shank to be on one side of groove or channel 20, the portion of the bolt to the other side thereof is called the tip, and bolt 10 is provided with a tip surface T.

A diametrically compressible ring 21 is provided in groove 20. The ring may be a split ring, as shown in FIG. 2. A preferred form of this invention provides a ring having elastic properties and being provided with a gap, to form the split ring as shown in FIG. 2.

FIG. 1a shows a preferred form of a release tool 70. This form of tool 70 comprises a hollow circular cylinder whose proportions and dimensions relative to the remainder of the structure are described in more detail below.

In general, throughout the specification, the diametrically compressible ring is called a ring and the release tool is called a tool. The shaped annular groove is called a groove.

FIG. 3a, 3b, and 3c show different stages in the use or operation of the bolt, as examplified in one form thereof. These figures show the locking means portion of a bolt, of one form of the invention, and consistent with the bolt as illustrated in FIG. 1 for example. These figures show that the ring 21 preferrably has a simple circular cross-section, as is commonly found in such rings. In FIG. 3a, and in some other figures, a parenthetical reference to another figure refers to one or another of the somewhat idealized showings of the cross-sectional configurations of the annular or circumferential grooves illustrated in FIG. 12-20, which show different forms thereof.

In the embodiment of FIG. 3a, 3b and 3c, the bolt 10 is provided with a shank portion which fits through a hole in the work piece 32. The shank portion ends at a circumferential groove 20. The groove has an inwardly extending first wall surface "a," a root or bottom surface "b" and a second wall surface "c" extending from the surface "b" to the tip surface T. In this embodiment, the first surface "a" is perpendicular to the shank surface S, the root surface "b" is parallel to the shank surface S, and the second surface c is a straight line slope extending from the surface b to the tip surface T with the slope rising toward the right end surface R. The diameter of the tip is slightly less than that of the diameter of the shank. The ring 21 has proportions chosen such that when it is at least partially diametrically compressed from its normal unbiased condition, its outer dimention permits it to pass through the hole in work piece 32 when it is over the root surface b of groove 20.

FIG. 3a shows the bolt 10 moving to the right, in the direction of the arrow, with the ring 21 part way through the work piece 32. The ring 21, in its unbiased state, has an outside diameter slightly larger than the outside diameter of the shank. It normally rests loosely in the groove 20. Its free position is indicated in an idealized way in FIG. 1.

Referring to FIG. 1, if the bolt 10 is inserted into the work piece 32 from the left hand side, it is apparent that the left hand edges of the hole through work piece 32 intercept the ring 21 and as the bolt is moved to the right during insertion, these edges cam the ring so that it compresses its diameter elastically, as by narrowing the gap therein, until its outside diameter permits it to pass through the hole. It is apparent that this operation forces the ring 21 against the first wall surface a, which positions the ring over the root surface b, which is that portion of the groove 20 permitting the greatest decrease in diameter of the ring. FIG. 3a shows this condition of the ring relative to the bolt, being pressed against the first wall "a" and being positioned on or directly over the root surface "b". FIG. 3a, shows the bolt almost pushed completely through the work piece 32, so that any further motion of the bolt to the right will permit the ring 21 to expand beyond the end of the work piece. It may be said that the forces on the ring in the locked position tend to pivot it against the second surface, although of course when locked, there is no actual pivoting motion.

FIG. 3b shows the bolt in the fully inserted and locked position. A pull on the bolt to the left, in the direction of the arrow, will not remove the bolt from the work piece. FIG. 3b shows such a pull and illustrates the result. The ring 21, after having been fully inserted through and past the work piece, expands due to the natural elasticity or resiliency thereof, so that its outside diameter is greater than the diameter of the shank S and greater than the diameter of the hole through the work piece 32. The inside diameter of ring 21 is less than that of the tip T. The pull to the left causes the right edge of the hole through the work piece 32 to bear against the ring, but it does not expand the ring or drive it out of the groove 20; it forces it against the second surface c and provides a positive lock.

FIG. 3c shows the tool 70 just at the point of being applied to release the locking means and permit withdrawal of the bolt 10 to the left. The hollow circular cylinder 70 is dimensioned so that it slips over the tip surface T and, moving in the direction of the arrow, bears against the ring 21 around its circumference. In the embodiment illustrated in FIG. 3c, the ring 21 is so dimensioned that the edge of the tool 70 strikes the ring at a point above the horizontal diameter through the cross section of the ring (that is, outside the mean diameter of the ring). The motion of the tool in the direction of the arrow exerts a camming force on the ring which moves it against the first wall surface "a" and also helps compress the overall diameter of the ring, forcing it toward or onto the bottom surface "b." The tool need only hold the ring against surface "a," and when withdrawal starts, the inner edge of the workpiece hole, which contacts the ring outside its mean diameter, provides the camming action. Thus, the tool itself may or may not directly contribute to camming.

The bolt may then be withdrawn toward the left through the hole in the workpiece. In the embodiment shown in FIG. 3c, the outer diameter of the tool 70 permits it to pass through the hole in the workpiece, and the inner diameter permits it to pass over the tip surface T. This permits the tool 70 to hold the ring in its withdrawal position, against surface "a," and to follow through as the bolt is withdrawn. Thus, the tool 70 passes through the hole in the workpiece. An advantage of this is that the ring is prevented from accidentally expanding into any gap or break in the inner surface of the tool through the workpiece. Thus, referring to FIG. 1, through normal fabrication processes, the neatly abutting edges of the two pieces making up the workpiece 32 in practice would probably have a slight chamfer, so that half way through the combined workpiece, the hole has a small circumferential expansion. It is to prevent any possible hang-up or detend effect on such discontinuities that the follow-through is used. For some angles of slope of second wall surface "b," there would be jamming even in a smooth workpiece hole bore if the tool does not follow through to hold the ring against surface "a," so follow-through is preferable. The tool may alternately be dimensioned so that it over-rides the ring and captures it in the groove, with the left end of the tool butting against first wall surface "a." It is also within the scope of the invention to dimension the tool so that it may over-ride both ring and shank and still fit through the hole, but this is an unlikely use because of clearance problems.

In practice, it is usually desirable to make the tip with a slightly smaller diameter than that of the shank. Such a construction is shown in the embodiments of FIG. 3a, 3b, and 3c. As a practical matter, this makes it somewhat easier to start the tool onto the bolt. Another function produced by this reduction is that the tip can accept a tool having a smaller inside diameter than would otherwise be the case. This permits a tool to have a thicker wall dimension, for structural reasons, and still have an outside diameter that permits it to follow through the hole. It is also apparent that the provision of the slightly reduced diameter on the tip portion reduces some of the diamensional tolerance requirements.

FIG. 4 shows the locking means of the present invention used other than as the sole means of retention. The ring and groove together may be said to comprise the locking means in this specification. It is also apparant that the description of the structure in operation of the invention as set forth above in connection with FIG. 3a, 3b, and 3c for example is applicable to the operation of the locking means in any appropriate environment, including those of FIG. 4 and the following figures. FIG. 4 shows a self-retaining bolt 10 having a head and passing through aperture 32a in work piece 32. The bolt is held in place by a retaining washer 41. This in turn is held in place by a cotter pin passing through a transverse hole through the bolt. The locking means is provided on the bolt on the far side, that is, to the right as illustrated, of the primary retaining means. The locking means of the present invention, the ring 21 and the groove 20, thus acts as a safety means should the cotter pin be missing or lost.

FIG. 5 shows a threaded bolt provided with a nut 51, with the locking means of the present invention being provided on the far side of the threads as a safety device. The primary holding means here is the nut. In this embodiment, the outside diameter of the ring 21, designated X, is greater than the minor or root diameter of the threaded shank surface S', when the bolt is in the locked condition and therefore the ring 21 is expanded. Thus, if the nut 51 works off the threads, it will intercept the ring and be retained by it.

FIG. 6 shows another embodiment of the locking means on the far side of the threaded bolt provided with a nut. A washer 43 is provided between the nut 51 and the work piece 32. The description given above, and particularly in connection with FIG. 5, apply to this and to the other threaded bolt embodiments also. The important difference illustrated in FIG. 6 is the provision of a different form of release tool 75. This is a forked release tool. It may be provided with three fingers, preferably equally angularly spaced around the circumference thereof, facing to the left, each being provided with a camming surface 75a as shown. The tip of the bolt 10 is provided with a plurality of slots 14 starting from the right hand end of the bolt and running to the left until they intercept the groove 20, as shown. The camming surfaces 75a can be moved into the corresponding slots 14, and the proportions are such that the first contact of the camming surfaces with the ring 21 is made outside the mean diameter of the ring so that the camming action compresses the diameter of the ring 21. An advantage of this structure is that there is less dimensional criticality. The diameter of tip T may be the same as that of shank S.

FIG. 7 shows a threaded lock bolt environment for the locking means in which the nut 51 over the threaded shank surface S' has provided on the far side a retention washer 44 which has a close fit on the smooth shank surface S. The locking means thus serves as a safety feature to prevent the washer 44 from working loose.

FIG. 8 shows a quick-release embodiment of the invention. Another aspect of this embodiment is that the locking means of the invention can be released from the left hand end of the boot, that is, the end which is not first inserted into the hole 32a. This embodiment may also be described as a remote release type or a "wrong end" release type. It has particular applicability to situations in which after the bolt is inserted in the work piece, there is no access or inconvenient access to the inserted end, or where the work piece hole is blind. The locking means, comprising the ring and groove, as described elsewhere, is provided. The difference in this embodiment lies in the nature of the release assembly, generally designated 80. It includes a release tool 85, which is a hollow circular cylinder, such as has been described in connection with the release tool 70. This embodiment of the tool however is closed at the right hand end to form a cup-shaped tool. A rod 81 is provided through a hole provided therefore longitudinally through the bolt 10. The right hand end 82b of the rod 82 is affixed to the center of the release tool 85. The left hand end 85a is affixed to a release handle 84.

Release handle 84 is provided with an inwardly facing annular collar 84a which abuts an annular flange 15 provided on the bolt.

In the locked position, the handle 80 rests against the left end surface L of the bolt. A spring 86 is provided between the bottom of the "cup" 85 and the right end surface R of the bolt. This may preferably be a bifurcated spring having one leg positioned on each side of the release rod 82. This spring biases the release tool 85 to the right, that is, into an inoperative position. It is apparent that when the handle 84 is pulled to the left, the tool 85 releases the locking means and permits the withdrawal of the bolt from the work piece 32.

FIG. 9 shows a different form of release tool 12. It comprises a slightly bent wire. It is applicable to the embodiment as illustrated in FIG. 10. In this embodiment, the locking means of the present invention is shown positioned inside of, that is, to the left, of a nut 52 over a threaded tip surface T'. If the primary locking means, the nut 52, should be lost, the locking means of the present invention would retain the bolt. A close fitting washer 42 is provided to the left of the nut 52 and the locking means 20,21. As shown, in this embodiment, the washer 42 has a close fit to the shank surface S. A transverse release hole 11 is provided through the bolt 10. This release hole 11 intercepts the second surface of the groove that is identified as surface "c" in other embodiments.

To release the bolt of the embodiment of FIG. 10, the nut 52 is removed. Then, the bent wire of FIG. 9 is inserted into the hole 11 and is retained there by reason of its bend which provides an elastic friction fit of the wire in the hole. The wire 12 is long enough to extend up into the groove 20 and to force the ring 21 against the first surface, identified as surface a in other illustrations. Then, the bolt may be pushed to the left, and the camming action of the retaining washer 42 reduces the diameter of the ring 21 and permits withdrawal.

It is apparent that the inner edge of washer 42 should intercept the ring 21 at a point above its horizontal diameter so as to cam it inwardly.

It is also apparent that this releasing camming action can be produced by the right hand inner edge of the work piece 32 when the release tool 12 holds the ring 21 over the bottom surface of the groove 20.

FIG. 11 illustrates another embodiment in which the locking means comprising the ring and groove 21, 20 of the present invention retains the bolt directly if the primary means, the nut, is lost. A nut 52 is provided over the threaded tip surface T' and the locking means 20, 21 are within the nut 52. In this embodiment, as distinguished from that of FIG. 10, the release means is of the type described for example in connection with FIG. 5.

FIG. 12–20 show in a somewhat idealized way a number of different channels or grooves falling within the ambit of the present invention. In each of these, the reference numerals and letters are as have been described above. The only additional reference is to the lid "d" which is shown in the embodiments of FIG. 14, 17 and 19. The lip "d" may be considered an extension of the second wall surface "c." It is a relatively short surface running perpendicular to surface T and extending therefrom to the right hand end of the main portion of second wall surface "c." All of the embodiments of FIG. 12–20 are shown with the outside diameters of surfaces S and T equal except for FIG. 13 which shows the tip having a reduced diameter. It is understood that the invention may be practiced when the diameters of the shank and the tip are equal, but as has been explained, for several reasons, it is preferable to have the tip diameter somewhat reduced for some applications.

The embodiment of FIG. 14 is preferred for many applications, especially where there are strict specifications, as anti-vibration requirements. The lip "d" tends to aid in insuring that the ring remains caught in the groove and does not ride out of it over the tip surface T. The length of lip "d" is at most only a minor proportion of the length of the first wall surface "a." If the dividing lines between the various surfaces of the groove are rounded into one another, for machining or stress relief purposes, or for other reasons, the embodiment of FIG. 14 tends to approach that of FIG. 17 between which there is not believed to be any important difference. FIG. 12 corresponds to FIG. 14 and FIG. 16 corresponds to FIG. 17 with the exception that the lip is omitted. The embodiments of FIG. 15 and 19, in which the second wall surface "c" is stepped are less preferable, but are included to illustrate a possible working embodiment. It may be said that these steps in FIG. 15 and 19 comprise a second wall surface "c" having an average slope like that which has been described above.

The embodiments of FIG. 18 and 20 are very much less preferable but are included to show that the first wall surface "a" does not necessarily have to be absolutely perpendicular to the shank surface S, although a perpendicular wall "a" has been found to be preferable.

It is understood that any of the workable grooves can be applied to any of the environments as illustrated in FIG. 1–11, with the preferences of certain forms of the grooves as has been described. It is also apparent that the use of different release means and release tools is independent of the configuration of the groove, and is a matter of choice or preference to suit the particular application.

FIG. 21 shows the locking means portion of a lock bolt of the embodiment as idealized in FIG. 14, positioned in the fully inserted position with respect to a work piece, with some typical dimensions which have been found to be useful and satisfactory. The following table gives the dimensions related to FIG. 21, for bolts of nominal diameter size three-eighths inch and nine-sixteenths inch.

| Nom. Bolt size | E | B | C | M | D | L | Y | Z | Nom. hole size H |
|---|---|---|---|---|---|---|---|---|---|
| 3/8" | .350 | .275 | .310 | .390 | .374 | .030 | .112 | .045 | .375 |
| 9/16" | .530 | .435 | .472 | .581 | .560 | .040 | .136 | .060 | .562 |

It has been found that the maximum installation or insertion force is no more than about 50 pounds for these bolts, and the pull out force is in excess of about 1,000 pounds for the three-eighths inch bolt and in excess of about 2,500 pounds for the nine-sixteenths inch bolt.

All or most of the critical positional and dimensional relationships to make the locking operative have been described above. The ring 21, which may be described as a C-ring or a split ring, for example, must have certain relationships to the groove 20 and the bolt 10. In its free or uncompressed state, the inner diameter of the ring must be less than the outer diameter of both the tip and the shank portions of the bolt. The ring, when compressed as far as it can go, either by its structural limitations, as for example the closing of the gap in the ring, or by bottoming on the bottom or root surface "b," must have an outside diameter no greater than the inside diameter of the hole in the work piece through which it is to be inserted or withdrawn. To describe this limitation in terms of the bolt itself without specific reference to the work piece, it may be said that when the ring is in its compressed condition, its outside diameter must not exceed the outside diameter of the bolt shank plus the tolerance intended between the bolt shank and a hole through which it is adapted to fit.

Very broadly stated, the bolt has a shank portion, followed by a circumferential groove, with the groove having a first wall, a bottom, and a second wall, with a tip portion of the bolt following the second wall of the groove. The first and second walls have different average slopes with respect to the shank surface. The first wall has an average slope substantially more nearly perpendicular to said surface than the second wall. The second wall has an average slope at an angle substantially more acute than that of the first wall with respect to said surface, with the second wall sloping from the bottom of the groove to the tip surface in the same direction as the bolt is intended to be inserted into a work piece. A compressible ring is provided in the groove. Limitations of the ring have been set forth above.

Broadly considered, the requirements to make this locking means releaseable upon the application of a tool are quite simple. It must be possible to provide some tool in contact with the ring 21 to force it against the first wall a without expanding it or preventing it from being compressed. Then, upon the bolt being withdrawn, the edge of the work piece hole itself, for example, can cam the ring into its reduced diameter condition. Thus, the releasing tool can serve its release function without itself actually camming the ring and the broadest limitations on the release tool is that it not exert any force on the ring tending to increase it diameter. Thus, the release tool should contact the ring at or outside of the means diameter of the ring.

It is understood that if a follow through of the tool through the hole in the work piece is not required, the tool, as examplified in the hollow cylinder 70 in FIG. 1a, can be made with a much thicker shell.

Where it is desired that the release tool itself exert the diameter reduction force on the ring, the limitations as were described above in connection with FIG. 3c are applicable. Broadly, under these conditions, it may be said that at least some part of the line of intersection of the second wall with the tip surface, there must be a reduction in diameter from that of the shank. This reduction can be accomplished by having the tip of a smaller diameter than the shank, as in FIG. 3c and FIG. 13, or by providing slots which intersect the second wall of the groove as in FIG. 6, or by providing a transverse hole with intersects the second wall of the groove, as in FIG. 10.

A characteristic of this invention is that in the locked position, the locking means of the bolt is beyond the confines of the work piece, or at least beyond the confines of the normal portion of the hole through the work piece, as illustrated.

Some other design limitations have been developed. As the slope of the second wall surface (surface "c")

becomes shallower, more free travel of the bolt is permitted before the locking effect. As the slope of this wall becomes steeper, it becomes more possible for the ring to cock over the edge of the groove when the ring hangs down freely in the groove. There are design preferences, and for design purposes, a compromise is reached depending on the nature of the application. The angle of slope required by the dimensions given in the foregoing table are of a satisfactory and preferable order.

As has been described, it is possible to rely on the edge of the hole in the workpiece to provide the camming action to compress the ring, with the key function of the release tool being to move the ring and hold it against the first wall surface "$a$." With such practice, the edge of the hole should not be a very sharp edge; there should be some slope or incline so that there is a camming action against the ring rather than a biting into the ring. As a matter of normal machining practice in many applications, the edge of the hole is slightly chamfered and this serves the purpose as described. As stated above, the release tool can be of the follow through or no follow through type, with the follow through being preferred. In the drawings, FIG. 3c illustrates a release tool capable of follow-through. For the sake of complete illustration, FIG. 1 and 1a together illustrate a release tool having no follow through becuase the outside diameter of the tool is larger than the hole through the workpiece 32. It is apparent that if follow through is desired, the grip length of the tool must be long enough to control it, in releation to the length of the hole.

It is clear that the ring or spring as described in this invention can take a variety of forms, provided that it is capable of being compressed in diameter as has been described. Thus, while the simplest and most obvious form of circular cross-section circular overall shape c-ring has been illustrated, it is apparent that other ring material cross-sectional shapes could be used or the overall configuration could be modified away from th circular, or away from a single gap, but the principle of the invention remains and the invention is operative without regard to such modifications.

There are certain other limitations which apply to this invention, or ways of restating limitations which have been described above. Such statements or restatements of limitations are as follows:

The minimum hole size in the work piece less twice the maximum ring material cross-sectional diameter equals the maximum diameter of the bolt as the root portion of the groove. In terms of FIG. 21, this is expressed as follows:

$$H_{min} - 2Z_{max} = B_{max}$$

The lower limit of the bolt diameter at the root portion of th groove, that is, dimension B in FIG. 21, is determined by the desired strength of the bolt.

Another lower limit for bolt diameter at the root section of the groove, as a matter of good design choice, and not as a matter of theoretical operability, is related to minimizing the amount of free play or backout permitted the bolt before the locking means takes hold. That is, as has been described above, as the second groove wall surface "$c$" gets shallower, the travel of the ring axially of the bolt gets longer and permits more free play. The same effect occurs as the second wall surface "$c$" gets longer. As the diameter of the bolt at the root is reduced, it is apparent that the wall surface $c$ does get longer.

Another limitation, highly preferable in any event, and essential if the camming action of the edge of the hole through the workpiece is relied upon, in part or in whole, to compress the ring, is that the mean diameter of the ring in its unconstrained state must be less than that of the workpiece hole size. If the release tool is relied upon, in whole or in part, to cam the ring to its compressed state, the mean ring diameter must be equal to or less than the diameter of the ring contacting portion of the release tool.

Generally, the workpiece hole diameter means the minimum hole diameter and the hole is the distance spanned by the entire grip length of the bolt. Thus, in FIG. 10, for example, the grip length extends to the right hand face of washer 42, and the hole through that washer is considered part of the workpiece hole for this invention. Thus, the significant workpiece hole diameter for the purpose of camming the ring 21 is the diameter of the hole through washer 42. In the embodiment of FIG. 7, the right hand edge of the hole through washer 44 performs this function.

The grip length of the bolt is the distance from side to side of the workpiece between the points at which the bolt bears against or grips the workpiece and in the context of this invention, the location of the locking means of this invention is one of the points defining the grip length.

For a threaded bolt, the lock means of the present invention is located along the bolt at or adjacent one end or the other of the thread runout.

In the foregoing description, the overall diameter of the ring has been related to workpiece hole diameter. Where close tolerances or clearances between the hole and shank are used, as in many aircraft applications for example, as a practical matter, it may be said that the lock means is operative if the uncompressed or unconstrained diameter of the ring is greater than the shank diameter and the compressed or contained diameter of the ring is no greater than the shank diameter. In such applications, as a practical matter, if these requirements are met, the other requirements as set forth in this specification are also met.

I claim:

1. A joint assembly comprising a plurality of workpieces in overlying relationship and having an opening extending from the outer surface of one of said workpieces to the outer surface of another of said workpieces, a fastener securing said workpieces together, said fastener comprising a generally smooth cylindrical shank having a length substantially equal to that of said opening in said workpieces and having a bearing surface at one end for engagement with said outer surface of said one of said workpieces, said fastener further comprising a tip having a diameter less than that of said shank throughout at least some portion of its circumference and being connected to said shank by a groove, said fastener being moveable between a first position wherein said bearing surface engages said outer surface of said one of said workpieces and said tip and said groove are located entirely beyond said outer surface of said another of said workpieces and a second position wherein said bearing surface is spaced from said outer surface of said one of said workpieces and a portion of said groove is located within said opening in said workpieces, said groove being formed by a first wall portion forming a generally radial shoulder at the end of said shank portion and a second wall portion having a first diameter section adjacent said shank portion and a second diameter section adjacent said tip portion, said second diameter section being larger than said first diameter section, an elastically compressible retaining ring carried in said groove, said ring having a solid cross-section and, in the uncompressed state, having an inner diameter less than that of said shank and said tip, an outer diameter greater than that of said shank and said opening in said workpieces and a mean diameter less than that of said opening, whereby said ring will retain said fastener in said opening when said fastener moves to said second position by reacting between said second diameter section of said groove and the edge of said opening at said outer surface of said another of the workpieces, the diameter of the cross-section of said ring being no greater than the radial distance between said first diameter section of said groove and the wall of said opening in said workpieces, where by when in locking position said ring will engage the edge of said opening along a line spaced radially outwardly of a vertical plane extending along the diameter of said ring, so that the combination of the transverse axial components of force acting on the ring from the engagement of the ring with the edge of the opening results in the ring tending to pivot about the edge of the opening and be forced in against said second wall portion when a withdrawal force is applied to the fastener, and said fastener can be removed from said opening when said fastener is in said first position and when said ring is located adjacent said shoulder and said first diameter section of said groove, causing a portion of said ring beyond said mean diameter thereof to react against said edge of said opening adjacent said outer surface of said another of said workpieces and compressing to a diameter no greater than that of said opening.

2. A joint assembly in accordance with claim 1 wherein said second wall of said groove is generally frusto-conic.

3. A joint assembly in accordance with claim 1 wherein said tip has a diameter less than that of said shank throughout its entire circumference.

4. A joint assembly in accordance with claim 3 wherein said fastener includes a threaded portion adjacent said tip.

5. A joint assembly in accordance with claim 1 wherein said mean diameter of said ring is no greater than that of said tip.

6. A joint assembly in accordance wtih claim 1 wherein said fastener carries a removal tool adapted to slide over said tip and having an outer diameter less than that of said opening in said workpieces.

7. A positive locking self-retaining fastener including a shank and a tip interconnected by a groove, said shank having a generally smooth outer surface and having a bearing surface at the end opposite said tip, at least some portion of said tip having a diameter less than that of said shank, said groove including a first wall adjacent said shank and a second wall having a smaller diameter section adjacent said shank and a larger diameter section adjacent said tip, said first wall defining a generally radial shoulder at the end of said shank, an elastically compressible ring having a solid cross-section carried in said groove, said ring, in the uncompressed state, being movable axially of said groove between said first and second diameter sections and having an inner diameter less than that of said shank and said tip, an outer diameter greater than that of said shank and said tip and a mean diameter no greater than that of said tip, the radial depth of said shoulder being at least equal to the diameter of said cross-section of said ring whereby said ring can be compressed when located adjacent said first diameter section so that said outer diameter of said ring is substantially equal to the diameter of said shank, and whereby in the locking position said ring will engage an edge of an opening in a workpiece along a line spaced radially outwardly of a vertical plane extending along the diameter of said ring, so that the combination of the transverse and axial components of force acting on the ring from the engagement of the ring with the edge of the opening results in the ring tending to pivot about the edge of the opening and be forced in against said second wall portion when a withdrawal force is applied to the fastener.

8. A fastener in accordance with claim 7 wherein said second wall of said groove is frusto-conic.

9. A fastener in accordance with claim 7 wherein said tip has a diameter less than that of said shank throughout its entire circumference.

10. A fastener in accordance with claim 9 wherein said fastener includes a threaded portion adjacent said tip.

11. A fastener in accordance with claim 7 wherein a removal tool is slideably carried on said tip and wherein the outer diameter of said tool is substantially equal to the diameter of said shank.

12. A positive locking self retaining bolt adapted to be inserted into a hole in a work piece, said bolt including a shank and a tip, said tip being adapted to be inserted into said hole first, and lock means on said bolt to automatically lock said bolt in said hole when inserted through and past said hole and to be selectively releasable,
  said lock means comprising an annular groove in said bolt, transverse to the long axis of said bolt, between said shank and tip,
  said groove comprising a first wall adjacent said shank a second wall adjacent said tip, and a bottom between said walls, said first wall being about perpendicular to said long axis, said second wall having an average slope from said bottom to the surface of said tip, in the direction along said long axis away from said shank,
  the diameter of said tip being less then the diameter of said shank at least some portion of the circumference of the bolt at the line of juncture between said second wall and said tip by means of a hole provided entirely through said tip of said bolt, transverse to the long axis thereof, and intercepting at each end thereof said second wall but not intersecting said first wall, with the distance between said first wall and the side of said transverse hole nearest said first wall equal to the diameter of said ring, to accommodate a selectively applicable release tool,
  a ring having a solid cross-section and an elastically compressible outer diameter in said groove,
  said ring in the uncompressed state having an inner diameter less than the diameter of the shank and tip and greater than the distance of the bolt at said bottom of said groove, and having an outer diameter greater than said diameter of said shank and tip and greater than the diameter of said hole in said workpiece, said ring in the compressed state being positioned over said bottom of said groove and having an outer diameter no greater than the diameter of said hole in said workpiece.

13. A positive locking self-retaining bolt and a workpiece having a hole therethrough, said bolt passing through said hole, said workpiece comprising at least two pieces meeting to form an interruption in the bore of said hole, said hole ending in an edge at each end thereof, said bolt including a shank and a tip, the diameter of said tip being less than the diameter said shank at at least some portion of the circumference of the bolt at the line of juncture between said second wall and said tip to accommodate a selectively applicable release tool, and lock means on said bolt to automatically lock said bolt in said hole only when said lock means is inserted through and past said hole, and to be selectively unlockable only by selective application of said release tool, passable through said hole at least as far as all said interruptions to permit said bolt to be withdrawn from said hole, passing said interruption in said bore, said lock means comprising, a. an annular groove in said bolt, transverse to the long axis of said bolt, between said shank and said tip, said groove comprising a first wall adjacent said shank, a second wall adjacent said tip, and a bottom between said walls, said first wall being about perpendicular to said long axis, said second wall having an average slope from said bottom to the surface of said tip, in the direction along said long axis away from said shank, and b. an elastically compressible ring having a solid cross-section and an outer diameter in said groove, said ring having (1) an uncompressed state in which said ring has an inner diameter less than the diameter of the shank and tip and greater than the diameter of the bolt at said bottom of said groove, and having an outer diameter greater than the diameter of said shank and tip and greater than the diameter of said hole in said workpiece at said edge of said hole and having a mean diameter less than the diameter of said hole at said edge, (2) a compressed state being positioned over said bottom of said groove and having an outer diameter no greater than the diameter of said hole in said workpiece, said bolt having a normal operatively installed locked condition completely through said hole, with said lock means through and past said hole, securing said pieces of said workpiece, in which condition said ring is in said groove, in said uncompressed state, and free to move between said first and second walls, whereby in the locking position said ring will engage the edge of the hole in the workpiece along a line spaced radially outwardly of a vertical plane extending along the diameter of said ring, so that the combination of the transverse and axial components of force acting on the ring from the engagement of the ring with the edge of the hole results in the ring tending to pivot about the edge of the hole and be forced in against said second wall portion when a withdrawal force is applied to the fastener.

* * * * *